(12) United States Patent
Kim

(10) Patent No.: US 8,592,079 B2
(45) Date of Patent: Nov. 26, 2013

(54) RECHARGEABLE BATTERY

(75) Inventor: Duk-Jung Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 35 days.

(21) Appl. No.: 13/275,165

(22) Filed: Oct. 17, 2011

(65) Prior Publication Data

US 2013/0029189 A1 Jan. 31, 2013

Related U.S. Application Data

(60) Provisional application No. 61/512,792, filed on Jul. 28, 2011.

(51) Int. Cl.
*H01M 2/30* (2006.01)
(52) U.S. Cl.
USPC .......................................................... 429/178
(58) Field of Classification Search
None
See application file for complete search history.

(56) References Cited

U.S. PATENT DOCUMENTS

| 5,856,041 A | 1/1999 | Inoue et al. |
| 7,998,612 B2 | 8/2011 | Sumihara et al. |
| 2011/0008652 A1* | 1/2011 | Lee et al. ........................ 429/7 |

FOREIGN PATENT DOCUMENTS

| JP | 3418283 B2 | 4/2003 |
| KR | 10-2010-0075688 A | 7/2010 |

OTHER PUBLICATIONS

European Search Report dated Nov. 16, 2012, for corresponding European Patent application 11190654.1, (5 pages).

* cited by examiner

*Primary Examiner* — Patrick Ryan
*Assistant Examiner* — Wyatt McConnell
(74) *Attorney, Agent, or Firm* — Christie, Parker & Hale, LLP

(57) ABSTRACT

Provided is a rechargeable battery capable of easily connecting a terminal and a cap plate to each other. The rechargeable battery includes; an electrode assembly having a positive electrode and a negative electrode; a case receiving the electrode assembly; a cap plate coupled with the case; first and second terminals electrically connected to the electrodes; and a connecting member electrically connecting the first terminal to the cap plate, in which the connecting member may have an elastically deformable structure.

20 Claims, 8 Drawing Sheets

RECHARGEABLE BATTERY

CROSS-REFERENCE TO RELATED PATENT APPLICATION

This application claims priority to and the benefit of provisional application No. 61/512,792, filed on Jul. 28, 2011, in the United States Patent and Trademark Office, the disclosure of which is incorporated herein in its entirety by reference.

BACKGROUND

1. Field

The described technology relates generally to a rechargeable battery.

2. Description of Related Art

A rechargeable battery can be repeatedly charged and discharged, unlike a primary battery that cannot be recharged. A low-capacity rechargeable battery is typically used for a small portable electronic device such as a mobile phone, a laptop computer, and a camcorder. A large-capacity rechargeable battery is widely used as a power supply for driving a motor of a hybrid vehicle and the like.

Recently, a high-output rechargeable battery using a non-aqueous electrolyte solution with high energy density has been developed. The high-output rechargeable battery is configured of a large-capacity battery module in which a plurality of rechargeable batteries are connected to each other in series and used to drive a motor of devices requiring large power, for example, an electric car, or the like.

The battery module is generally configured by a plurality of rechargeable batteries that are coupled with each other in series, and each of the rechargeable batteries may be formed in a cylindrical shape, a prismatic shape, and the like.

When a case is positively charged, a positive terminal and a cap plate are electrically connected with each other such that the case can be positively charged. In order to electrically connect the positive terminal and the cap plate to each other, a connecting plate is installed between the positive terminal and the cap plate and fixed to the positive terminal and the cap plate by welding. However, a process of welding the connecting plate to the positive terminal and the cap plate is complicated. Furthermore, the cap plate may be deformed during the welding process.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery capable of easily electrically connecting a terminal and a cap plate to each other.

In one embodiment, a rechargeable battery includes an electrode assembly; a case housing the electrode assembly; a cap plate coupled to the case; a first terminal protruding from the cap plate and electrically connected to the electrode assembly; and a connecting member electrically connecting the first terminal and the cap plate, wherein the connecting member is elastically biased towards the first terminal or the cap plate.

Further, in one embodiment, the connecting member includes a first connector contacting the first terminal and a second connector contacting the cap plate, wherein the first connector is elastically biased towards the first terminal or wherein the second connector is elastically biased towards the cap plate. The first connector or the second connector may include two prongs and either connector may be generally V-shaped.

In one embodiment, the connecting member further comprises a first elastic portion between the first connector and the second connector and the first connector or the second connector may extend at an angle from the first elastic portion. Further, in one embodiment, the connecting member may further include a second elastic portion between the first connector and the second connector. Additionally, the connecting member may have a support located between the first elastic portion and the second elastic portion.

In one embodiment the connecting member has a fuse part. The fuse part may be between the support and the first elastic part and the fuse part may have an opening. Further, in one embodiment, the fuse part has a width less than a width of the first connector.

In one embodiment, the rechargeable battery includes a terminal base between the first terminal and the cap plate and supporting the first terminal. In embodiment, the terminal base may include a first support projection contacting the connecting member, wherein the first elastic portion contacts the first support projection, and a second support projection facing the first support projection, wherein the connecting member has a second elastic portion, and wherein the second elastic portion contacts the second support projection. The connecting member may also include a suspension member accommodated in the terminal base.

According to the exemplary embodiment, it is possible to easily connect the terminal to the cap plate by the elastically deformable connecting member.

DETAILED DESCRIPTION

Figure 1:
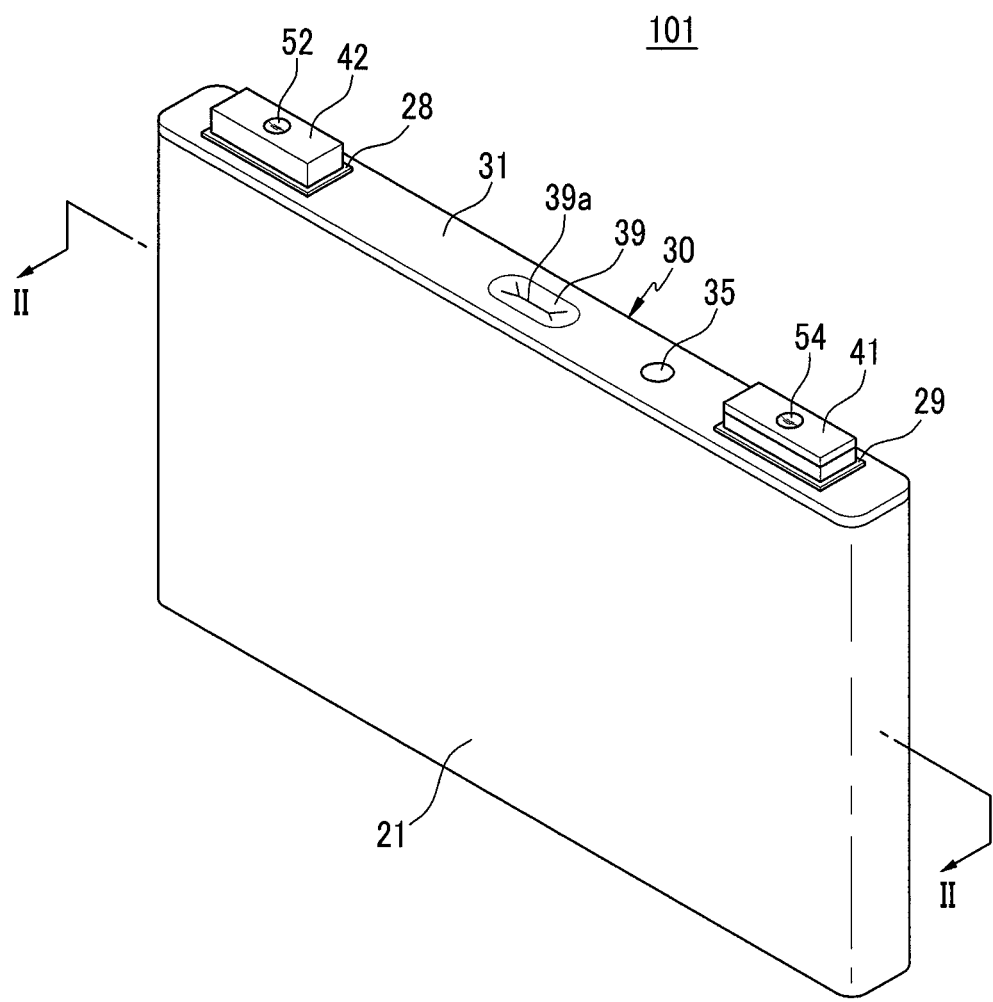
FIG. 1 is a perspective view illustrating a rechargeable battery according to a first exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention. Like reference numerals designate like elements throughout the specification and the drawings.

Figure 2:
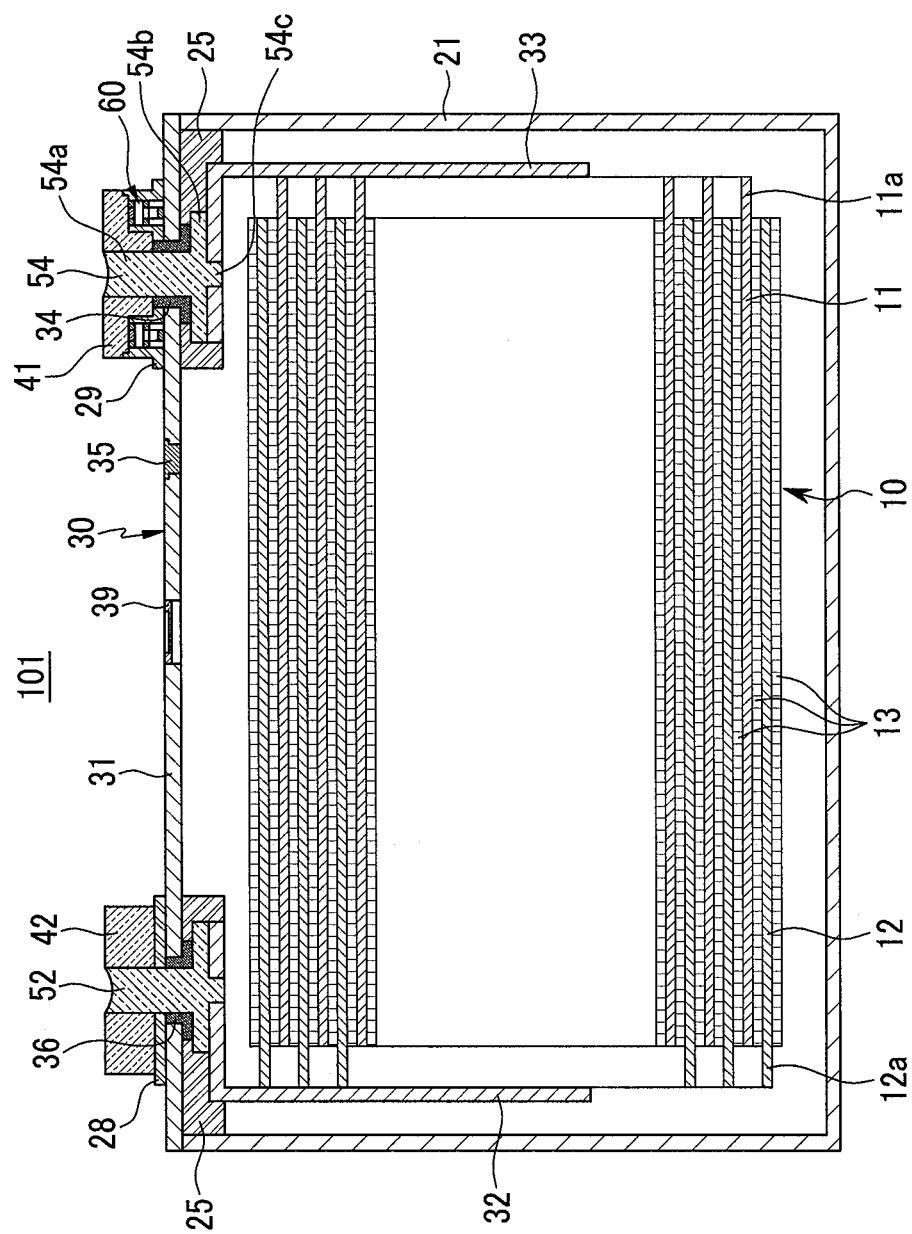
FIG. 2 is a cross-sectional view taken along a line II-II of FIG. 1.

FIG. 1 is a perspective view illustrating a rechargeable battery according to a first exemplary embodiment of the present invention, and FIG. 2 is a cross-sectional view taken along a line II-II of FIG. 1.

Referring to FIGS. 1 and 2, the rechargeable battery 101 according to the first exemplary embodiment includes an electrode assembly 10 wound with a separator 13 located between a positive electrode 11 and a negative electrode 12, a case 21 housing the electrode assembly 10, and a cap assembly 30 combined with an opening of the case 21.

The rechargeable battery 101 according to the first exemplary embodiment will be described with respect to a lithium ion rechargeable battery having a prismatic shape as an example. However, the present invention is not limited thereto and the present invention may be applied to various types of batteries such as a lithium polymer battery, a cylindrical battery, and the like.

The positive electrode 11 and the negative electrode 12 each include a coating region where an active material is coated on a current collector formed of a thin metal foil, and uncoated regions 11a and 12a where the active material is not coated.

The uncoated region 11a of the positive electrode 11 is formed at one end of the positive electrode 11 along the longitudinal direction of the positive electrode 11, and the uncoated region 12a of the negative electrode 12 is formed at one end of the negative electrode 12 opposite to the uncoated region 11a along the longitudinal direction of the negative electrode 12. The positive electrode 11 and the negative electrode 12 are wound after providing an insulator, that is, the separator 13 therebetween.

However, the present invention is not limited thereto and the electrode assembly 10 may be configured as a structure in which the positive electrode and the negative electrode formed by a plurality of sheets are layered with the separator interposed therebetween.

The case 21 is formed in a substantially rectangular parallelepiped shape, and an opening is formed on one surface of the case 21. The case 21 may be formed of a metal such as aluminum, stainless steel, and the like.

The cap assembly 30 includes a cap plate 31 covering the opening of the case 21, a first terminal 41 that protrudes towards the outside of the cap plate 31 and being electrically connected to the positive electrode 11, and a second terminal 42 that protrudes towards the outside of the cap plate 31 and is electrically connected to the negative electrode 12.

The cap plate 31 is formed in an elongated plate shape that extends in one direction, and is coupled with the opening of the case 21. The cap plate 31 includes a sealing closure 35 and a vent plate 39. The sealing closure 35 is installed on an electrolyte inlet. The vent plate 39 is installed on a vent hole and provided with a notch 39a to be opened at a predetermined pressure.

The first terminal 41 and the second terminal 42 protrude from the upper part of the cap plate 31.

The first terminal 41 is electrically connected to the positive electrode 11 through a current collecting tab 33, and the second terminal 42 is electrically connected to the negative electrode 12 through a current collecting tab 32. However, the present invention is not limited thereto and the first terminal 41 may be electrically connected to the negative electrode and the second terminal 42 may be electrically connected to the positive electrode.

The first terminal 41 is formed in a substantially square plate shape and is electrically connected to the current collecting tab 33 through a connecting terminal 54. The connecting terminal 54 includes a pole part 54a, a lower flange part 54b, and a lower protrusion 54c. The pole part 54a penetrates through the cap plate 31 and an upper end thereof contacts and is fixed to the first terminal 41. The lower flange part 54b protrudes from a lower end of the pole part 54a outward. The lower protrusion 54c protrudes from the lower end of the pole part 54a downward and is inserted and fixed into the current collecting tab 33 by welding. An upper end of the connecting terminal 54 is fixed to the first terminal 41 by welding.

A gasket 34 for sealing is provided between the first terminal 41 and the cap plate 31 and is inserted into a hole through which a terminal passes, and a lower insulating member 25 is located below the cap plate 31 to insulate the connecting terminal 54 and the current collecting tab 33 from the cap plate 31.

A terminal base 29 is installed between the first terminal 41 and the cap plate 31 and a connecting member 60 is installed in the terminal base 29 to electrically connect the cap plate 31 to the first terminal 41.

The second terminal 42 is formed in a substantially square plate shape and is electrically connected to the current collecting tab 32 through a connecting terminal 52. The connecting terminal 52 is fixed to the current collecting tab 32 by welding and penetrates through the cap plate 31 such that an upper end of the connecting terminal 52 contacts and is fixed to the second terminal 42. A gasket 36 for sealing is provided between the second terminal 42 and the cap plate 31 and is inserted into a hole through which the second terminal 42 passes, and a lower insulating member 25 is located below the cap plate 31 to insulate the second terminal 42 and the current collecting tab 32 from the cap plate 31.

A plate-shaped upper insulating member 28 for insulation is installed between the second terminal 42 and the cap plate 31. The connecting terminal 52 penetrates through the upper insulating member 28 and the second terminal 42 and an upper end of the connecting terminal 52 is fixed to the second terminal 42 by welding.

Figure 3:
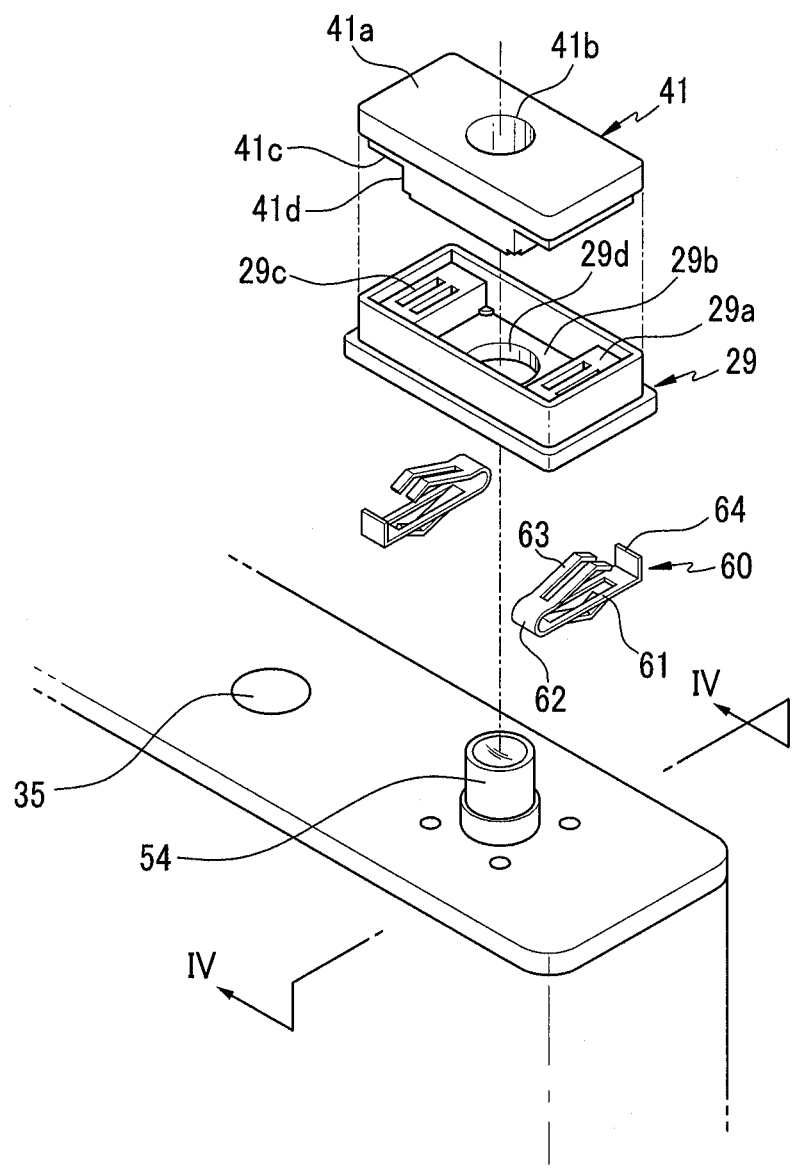
FIG. 3 is an exploded perspective view illustrating a portion of the rechargeable battery of FIG. 1.
Figure 4:
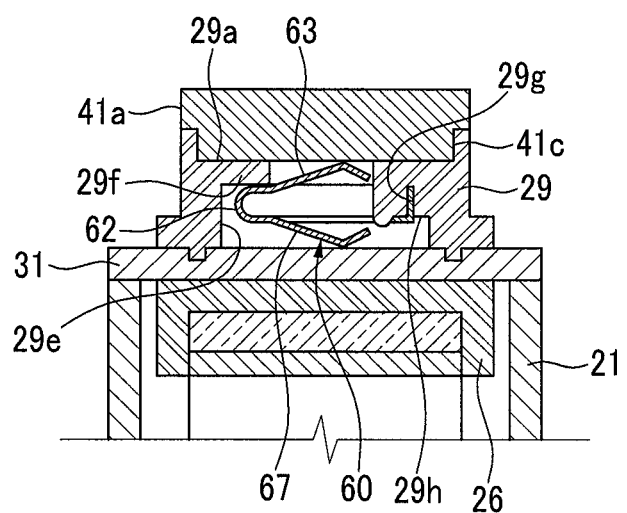
FIG. 4 is a cross-sectional view taken along a line IV-IV of FIG. 3.

FIG. 3 is an exploded perspective view illustrating a portion of the rechargeable battery according to the first exemplary embodiment of the present invention and FIG. 4 is a cross-sectional view taken along a line of FIG. 3.

Referring to FIGS. 3 and 4, the first terminal 41 includes a plate part 41a located on an upper portion, a terminal hole 41b formed in the plate part 41a, a connection protrusion 41c protruding from the plate part 41a downward, and a lower protrusion 41d protruding below the connection protrusion 41c.

The plate part 41a is formed in a square plate shape and provided with the terminal hole 41b into which a connecting terminal is inserted, at the center. The connection protrusion 41c protrudes toward a base terminal 29 below the plate part 41a and a lower surface thereof contacts a connecting member 60. The lower protrusion 41d protrudes from the connection protrusion 41c toward the terminal base 29 and is inserted into the terminal base 29.

The connection protrusion 41c is inserted into the terminal base 29 which includes a first groove or surface 29a formed at an upper part, a second groove or surface 29b formed inside the first groove 29a, a hole 29d formed in the second groove 29b and inserted with the connecting terminal 54, and a third groove or surface 29e inserted with a connecting member 60 and formed at a lower part.

The terminal base 29 is located below the first terminal 41 and is inserted with the first terminal 41 to support the first terminal 41. The first grooves 29a are located at both edges with the second groove 29b located therebetween and the first groove 29a includes a hole 29c into which a first connection part or first connector 63 of the connecting member 60 is inserted from below to be elevated. Two holes 29c are formed on the bottom of the first groove 29a located at one side of the terminal base 29. However, the present invention is not limited thereto and the number of the holes may vary depending on the number of the connection parts. The second groove 29b is lower than the first groove 29a and includes a hole 29d inserted with the connecting terminal 54, at the center.

A third groove 29e is formed at a lower portion of the terminal base 29 to form a space where the connecting member 60 is inserted. A first support projection 29f and a second support projection 29h, which protrude toward an inner side of the third groove 29e, are formed at an upper portion of the third groove 29e. The third groove 29e is in communication with an upper portion of the terminal base 29 through the hole 29c. Meanwhile, on the second support projection 29h, a support groove 29g is formed, into which a suspension part 64 of the connecting member 60 is inserted.

The connecting member 60 includes a first connection part 63 connected to the first terminal 41, a second connection part or second connector 67 connected to the cap plate 31, an elastic portion 62 curved to connect the first and second connection parts 63 and 67 to each other, and the suspension part 64 connected to the elastic portion 62, and bent and inserted into the support groove 29g.

The elastic portion 62 is curved in a substantially arc shape and the first connection part 63 is bent and elongated from the elastic portion 62 to be formed in a rod shape. Two first connection parts 63 are bent from the elastic portion 62 at an inclination angle to protrude upward. One side of the first connection part 63 in a longitudinal direction is bent and a bent portion contacts a bottom surface of the connection protrusion 41c. An angle formed when the first connection part 63 is bent from the elastic portion 62, is elastically changed, and as a result, the first connection part 63 contacts the first terminal 41, thereby minimizing a contact resistance.

A support portion 61 is formed by being elongated from a lower portion of the elastic part 62 and the second connection part 67 is bent at a hole formed at the center of the support part 61 to protrude downward. The second connection part 67 is bent at one side in a longitudinal direction and a bent portion contacts a top surface of the cap plate 31. An end of the support part 61 in a longitudinal direction is bent upward to form a suspension part 64 inserted into the support groove 29g.

According to the exemplary embodiment, the elastic part 62 is supported by the first support projection 29f and the suspension part 64 is inserted into the support groove 29g so as to be stably installed on the terminal base 29. In addition, since the elastic part is elastically deformable and the angles at which the first and second connection parts 63 and 67 are bent, are elastically changed, the connecting member 60 contacts the first terminal 41 and the cap plate 31, thereby stably connecting therebetween. Further, since the first terminal 41 and the cap plate 31 are elastically connected without welding, assembly work is simplified.

Figure 5:
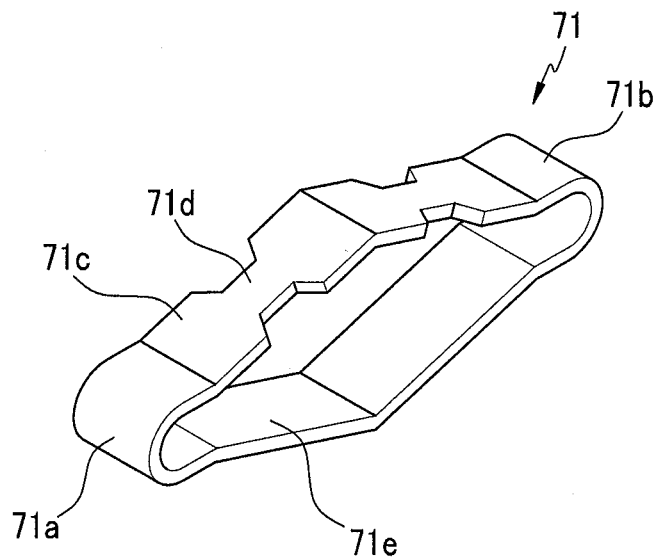
FIG. 5 is a perspective view illustrating a connecting member of a rechargeable battery according to a second exemplary embodiment of the present invention.
Figure 6:
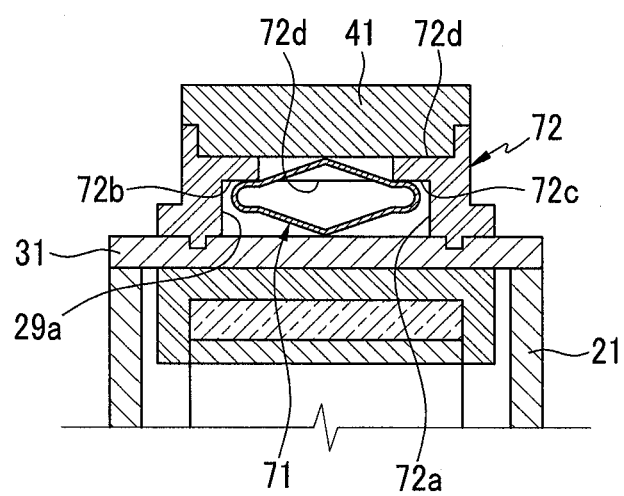
FIG. 6 is a cross-sectional view illustrating a portion of the rechargeable battery of FIG. 5.

FIG. 5 is a perspective view illustrating a connecting member of a rechargeable battery according to a second exemplary embodiment of the present invention and FIG. 6 is a cross-sectional view illustrating a portion of the rechargeable battery according to the second exemplary embodiment of the present invention.

Referring to FIGS. 5 and 6, the rechargeable battery according to the exemplary embodiment is configured by the same structures as the rechargeable battery according to the first exemplary embodiment, except for structures of a connecting member 71 and a terminal base 72 and thus, a description related to the same structures will be omitted.

A terminal base 72 includes an upper groove 72d inserted with a terminal at an upper portion and a lower groove 72a inserted with a connecting member at a lower portion. A first support projection 72b and a second support projection 72c are formed on a top end of the lower groove 72a and protrude inward. A hole 72d is formed between the first support projection 72b and the second support projection 72c so that a connecting member 71 protrudes toward an upper portion of the terminal base 72 to be connected to the first terminal 41.

The connecting member 71 includes a first connection part 71c connected to a first terminal 41, a second connection part 71e connected to a cap plate 31, and first and second elastic parts 71a and 71b curved to connect the first connection part 71c to the second connection part 71e.

The first elastic part 71a is connected to one ends of the first and second connection parts 71c and 71e and the second elastic part 71b is connected to the other ends of the first and second connection parts 71c and 71e. The first elastic part 71a and the second elastic part 71b are curved in a substantially arc shape and are elastically deformable. The first elastic part 71a contacts and is supported by the first support projection 72b and the second elastic part 71b contacts and is supported by the second support projection 72c.

The first connection part 71c is bent from the first elastic part 71a and the second elastic part 71b upward at inclination angles. The inclination angle of the first connection part 71c can be elastically changed.

The first connection part 71c is bent at a center in a longitudinal direction and a bent portion contacts a first terminal 41. Meanwhile, a fuse part 71d is formed on the first connection part 71 and has a longitudinal cross-sectional area smaller than a peripheral region. The fuse part 71d has a smaller width than the peripheral region and serves to disconnect the first terminal 41 from the cap plate 31 when current increases rapidly as internal short or external short occurs.

The first elastic part 71a and the second elastic part 71b are connected to both ends of the second connection part 71e in a longitudinal direction and the second connection part 71e is bent from the first elastic part 71a and the second elastic part 71b downward at inclination angles. The inclination angle of the first connection part 71c may be elastically changed. The second connection part 71e is bent at a center in a longitudinal direction and a bent portion contacts a top surface of the cap plate 31.

According to the exemplary embodiment, the first elastic part 71a and the second elastic part 71b are provided and the first connection part 71c and the second connection part 71e are elastically deformable, thereby stably connecting the first terminal 41 to the cap plate 31 by using an elastic force. Further, since the first elastic part 71a and the second elastic part 71b contact and are supported by the first support projection 72b and the second support projection 72c, the connecting member 71 can be stably located inside the terminal base 72.

Figure 7:
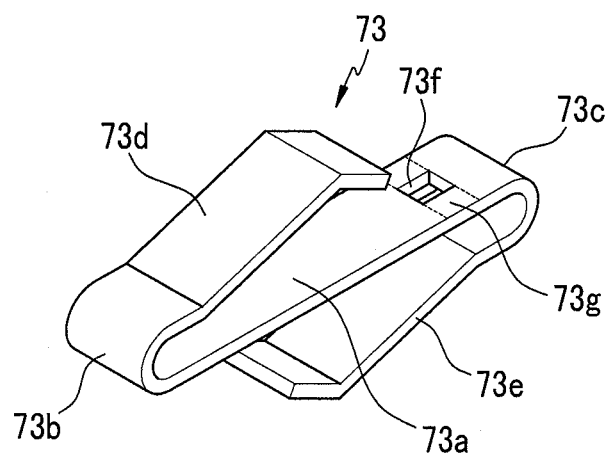
FIG. 7 is a perspective view illustrating a connecting member of a rechargeable battery according to a third exemplary embodiment of the present invention.
Figure 8:
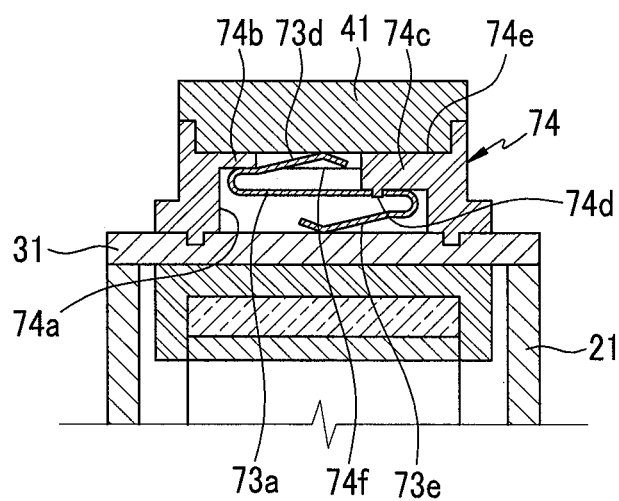
FIG. 8 is a cross-sectional view illustrating a portion of the rechargeable battery of FIG. 7.

FIG. 7 is a perspective view illustrating a connecting member of a rechargeable battery according to a third exemplary embodiment of the present invention and FIG. 8 is a cross-sectional view illustrating a portion of the rechargeable battery according to the third exemplary embodiment of the present invention.

Referring to FIGS. 7 and 8, the rechargeable battery according to the exemplary embodiment is configured to have a similar structure as the rechargeable battery according to the first exemplary embodiment, except for the structures of a connecting member 73 and a terminal base 74 and thus, a description related to the same structures will be omitted.

The terminal base 74 includes an upper groove 74e inserted with a first terminal 41 at an upper portion and a lower groove 74a inserted with the connecting member 73 at a lower portion. A first support projection 74b and a second support projection 74c are formed on a top end of the lower groove 74a and protrude inward. The second support projection 74c protrudes further down than the first support projection 74b and a hole 74f is formed between the first support projection 74b and the second support projection 74c so that the connecting member 73 protrudes toward an upper portion of the terminal base 74 to be connected to a first terminal 41. A protrusion 74d is formed on the second support projection 74c and inserted into a hole 73f formed in the support part 73a.

The connecting member 73 includes a first connection 73d connected to the first terminal 41, a second connection part 73e connected to the cap plate 31, a first elastic part 73b curved and connected to the first connection part 73d, and a second elastic part 73c curved and connected to the second connection part 73e, and a support part 73a connecting the first elastic part 73b and the second elastic part 73c to each other.

The first elastic part 73b is connected to one end of the first connection part 73d in a longitudinal direction and curved in a substantially arc shape to be elastically deformable. An upper end of the first elastic part 73b contacts and is supported by a bottom surface of the first support projection 74b.

The first connection part 73d is bent from the first elastic part 73b upward at an inclination angle. Herein, the inclination angle of the first connection part 73d may be elastically changed. The first connection part 73d is bent at one side in a longitudinal direction and a bent portion contacts the first terminal 41. The support part 73a is formed in a plate shape for connecting one end of the first elastic part 73b to one end of the second elastic part 73c and a top surface of the support part 73a contact and is supported by the second support projection 74c. A fuse part 73g is formed on the support part 73a and has a longitudinal cross-sectional area smaller than a peripheral region. The hole 73f is formed in the support part 73a and the fuse part 73g has a smaller width than the peripheral region because the hole 73f is formed. Since the hole 73f is inserted with the protrusion 74d formed on the second support projection 74c, when the fuse part 73g is melted to break the electric connection, the protrusion 74d is separated to prevent reconnection.

The second elastic part 73c is connected to one end of the second connection part 73e in a longitudinal direction and curved in a substantially arc shape to be elastically deformable. The second connection part 73e is bent from the second elastic part 73c downward at an inclination angle. The inclination angle of the second connection part 73e may be elastically changed. The second connection part 73e is bent at one end in a longitudinal direction and a bent portion contacts the cap plate 31.

According to the exemplary embodiment, the first elastic part 73b and the second elastic part 73c are provided and the first connection part 73d and the second connection part 73e are elastically deformable, thereby stably connecting the first terminal 41 to the cap plate 31 by using an elastic force. Further, since the first elastic part 73b and the second elastic part 73c contact and are supported by the first support projection 74b and the second support projection 74c, the connecting member 73 can be stably located inside the terminal base 74.

Figure 9:
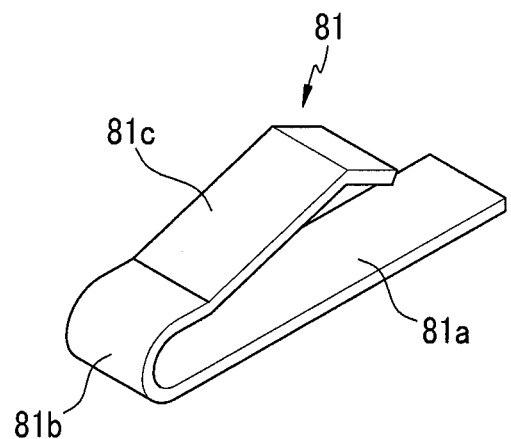
FIG. 9 is a perspective view illustrating a connecting member of a rechargeable battery according to a fourth exemplary embodiment of the present invention.
Figure 10:
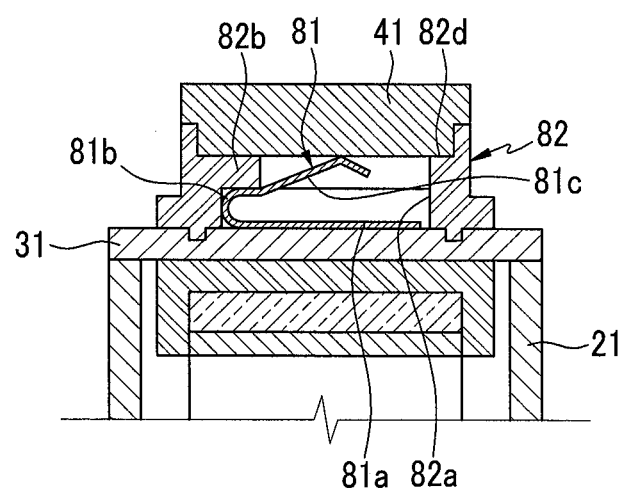
FIG. 10 is a cross-sectional view illustrating a portion of the rechargeable battery of FIG. 9.

FIG. 9 is a perspective view illustrating a connecting member of a rechargeable battery according to a fourth exemplary embodiment of the present invention and FIG. 10 is a cross-sectional view illustrating a portion of the rechargeable battery according to the fourth exemplary embodiment of the present invention.

Referring to FIGS. 9 and 10, the rechargeable battery according to the exemplary embodiment is configured by the same structures as the rechargeable battery according to the first exemplary embodiment, except for the structures of a connecting member and a terminal base and thus, a description related to the same structures will be omitted.

A terminal base 82 includes an upper groove 82d inserted with a first terminal 41 at an upper portion and a lower groove 82a inserted with a connecting member 81 at a lower portion. A hole is formed between the upper groove 82d and the lower groove 82a and connects the upper groove 82d and the lower groove 82a. The connecting member protrudes toward the upper groove through the hole. A support projection 82b is formed on upper end of the lower groove 82a and protrudes inward.

The connecting member 81 includes a first connection part 81c connected to a first terminal 41, a second connection part 81a connected to a cap plate 31, and an elastic part 81b curved to connect the first connection part 81c to the second connection part 81a.

The first connection part 81c is connected to one end of the elastic part 81b and the second connection part 81a is connected to the other end of the elastic part 81b. The elastic part 81b is curved in a substantially arc shape to be elastically deformable. A top surface of the elastic part 81b contacts and is supported by the support projection 82b and a bottom surface thereof contacts and is supported by the cap plate 31.

The first connection part 81c is bent from the elastic part 81b upward at an inclination angle. The inclination angle of the first connection part 81c may be elastically changed. The first connection part 81c is bent at one side in a longitudinal direction and a bent portion contacts the first terminal 41.

The second connection part 81a is elongated from the elastic part 81b in a lateral direction and a bottom surface of the second connection part 81a contacts a top surface of the cap plate 31.

According to the exemplary embodiment, the elastic part 81b is provided and the first connection part 81c is elastically deformable, thereby stably connecting the first terminal 41 to the cap plate 31 by using an elastic force. Although the second connection part 81a is not elastically deformable, the second connection part 81a is connected to the elastic part 81b, such that the second connection part 81a and the cap plate 31 can stably contact each other through elastic deformation of the elastic part 81b.

Figure 11:
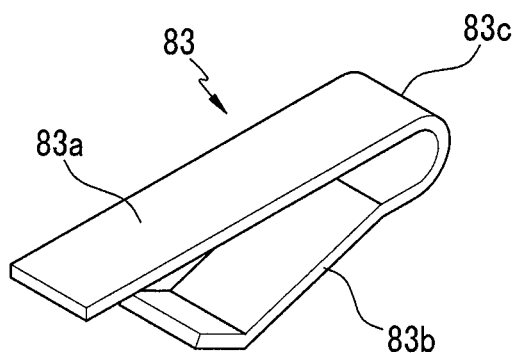
FIG. 11 is a perspective view illustrating a connecting member of a rechargeable battery according to a fifth exemplary embodiment of the present invention.
Figure 12:
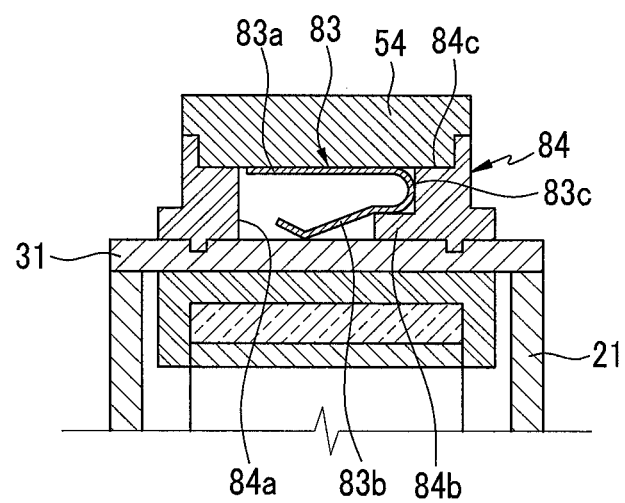
FIG. 12 is a cross-sectional view illustrating a portion of the rechargeable battery of FIG. 11.

FIG. 11 is a perspective view illustrating a connecting member of a rechargeable battery according to a fifth exemplary embodiment of the present invention and FIG. 12 is a cross-sectional view illustrating a portion of the rechargeable battery according to the fifth exemplary embodiment of the present invention.

Referring to FIGS. 11 and 12, the rechargeable battery according to the exemplary embodiment is configured by the same structures as the rechargeable battery according to the first exemplary embodiment, except for the structures of a connecting member and a terminal base and thus, repeating description related to the same structures will be omitted.

A terminal base 84 includes an upper groove 84*c* inserted with a first terminal 41 at an upper portion and a lower groove 84*a* inserted with a connecting member 83 at a lower portion. A support projection 84*b* is formed at a lower end of the lower groove 84*a* and protrudes inward. A hole is formed between the upper groove 84*c* and the lower groove 84*a* and connects the upper groove 84*c* and the lower groove 84*a*. The connecting member protrudes toward the upper groove through the hole.

The connecting member 83 includes a first connection part 83*a* connected to a first terminal 41, a second connection part 83*b* connected to a cap plate 31, and an elastic part 83*c* curved to connect the first connection part 83*a* and the second connection part 83*b*.

The first connection part 83*a* is connected to one end of the elastic part 83*c* and the second connection part 83*b* is connected to the other end of the elastic part 83*c*. The elastic part 83*c* is curved in a substantially arc shape to be elastically deformable. A top surface of the elastic part 83*c* contacts and is supported by the first terminal 41 and a bottom surface thereof contacts and is supported by the support projection 84*b*.

The first connection part 83*a* is elongated from the elastic part 83*c* in a lateral direction and a top surface thereof contacts a bottom surface of the first terminal 41.

The second connection part 83*b* is bent from the elastic part 83*c* upward at an inclination angle. The inclination angle of the second connection part 83*b* may be elastically changed. The second connection part 83*b* is bent at one end in a longitudinal direction and a bent portion contacts the cap plate 31.

According to the exemplary embodiment, the elastic part is provided and the second connection part is elastically deformable, thereby stably connecting the first terminal to the cap plate by using an elastic force.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 101: Rechargeable battery | 10: Electrode assembly |
| 11: Positive electrode | 11a: Positive uncoated region |
| 12: Negative electrode | 12a: Negative uncoated region |
| 13: Separator | 21: Case |
| 25: Lower insulating member | 28: Upper insulating member |
| 29: Terminal base | 29a: First groove |
| 29b: Second groove | 29c, 29d: Holes |
| 29e: The third groove | 29f: First support projection |
| 29h: Second support projection | 29g: Support groove |
| 30: Cap assembly | 31: Cap plate |
| 32: Current collecting tab | 33: Current collecting tab |
| 34: Gasket | 35: Sealing closure |
| 39: Vent plate | 41: First terminal |
| 41a: Plate part | 41b: Terminal hole |
| 41c: Connection protrusion | 41d: Lower protrusion |
| 42: Second terminal | 52, 54: Connecting terminal |
| 54a: Pole part | 54b: Lower flange part |
| 54c: Lower protrusion | 60: Connecting member |
| 61: Support part | 62: Elastic part |
| 63: First connection part | 64: Suspension part |
| 67: Second connection part | |

The invention claimed is:

1. A rechargeable battery comprising:
an electrode assembly;
a case housing the electrode assembly;
a cap plate coupled to the case;
a first terminal protruding from the cap plate and electrically connected to the electrode assembly; and
a connecting member electrically connecting the first terminal and the cap plate, wherein the connecting member is elastically biased towards the first terminal or the cap plate and wherein the connecting member directly contacts the cap plate.

2. The rechargeable battery of claim 1, wherein the connecting member comprises a first connector contacting the first terminal and a second connector contacting the cap plate.

3. The rechargeable battery of claim 2, wherein the first connector is elastically biased towards the first terminal or wherein the second connector is elastically biased towards the cap plate.

4. The rechargeable battery of claim 2, wherein the first connector or the second connector comprises two prongs.

5. The rechargeable battery of claim 2, wherein the first connector is generally V-shaped.

6. The rechargeable battery of claim 2, wherein the connecting member further comprises a first elastic portion between the first connector and the second connector.

7. The rechargeable battery of claim 6, wherein the first connector or the second connector extends at an angle from the first elastic portion.

8. The rechargeable battery of claim 7, wherein the first connector and the second connector extend at an angle away from each other.

9. The rechargeable battery of claim 6, wherein the connecting member further comprises a second elastic portion between the first connector and the second connector.

10. The rechargeable battery of claim 9, wherein the connecting member is generally diamond-shaped or generally Z-shaped.

11. The rechargeable battery of claim 9, wherein the connecting member has a support located between the first elastic portion and the second elastic portion.

12. The rechargeable battery of claim 11, wherein the connecting member has a fuse part.

13. The rechargeable battery of claim 12, wherein the fuse part is between the support and the first elastic part and wherein the fuse part has an opening.

14. The rechargeable battery of claim 12, wherein the fuse part has a width less than a width of the first connector.

15. The rechargeable battery of claim 6, further comprising a terminal base between the first terminal and the cap plate and supporting the first terminal.

16. The rechargeable battery of claim 15, wherein the terminal base comprises a first support projection contacting the connecting member.

17. The rechargeable battery of claim 16, wherein the first elastic portion contacts the first support projection.

18. The rechargeable battery of claim 17, wherein the terminal base further comprises a second support projection facing the first support projection, wherein the connecting member comprises a second elastic portion, and wherein the second elastic portion contacts the second support projection.

19. The rechargeable battery of claim 15, wherein the connecting member further comprises a suspension member accommodated in the terminal base.

20. The rechargeable battery of claim 1, further comprising a second terminal protruding from the cap plate and electrically connected to the electrode assembly.

* * * * *